(12) United States Patent
Cory et al.

(10) Patent No.: US 7,584,415 B2
(45) Date of Patent: Sep. 1, 2009

(54) COMMON CHARTING USING SHAPES

(75) Inventors: Daniel P. Cory, Seattle, WA (US); Miltos Vafiadis, Redmond, WA (US); Sissie Ling-le Hsiao, Santa Clara, CA (US)

(73) Assignee: Microsoft Corporation, Redmond, WA (US)

( * ) Notice: Subject to any disclaimer, the term of this patent is extended or adjusted under 35 U.S.C. 154(b) by 259 days.

(21) Appl. No.: 10/941,566

(22) Filed: Sep. 15, 2004

(65) Prior Publication Data

US 2006/0059414 A1 Mar. 16, 2006

(51) Int. Cl.
*G06F 17/00* (2006.01)

(52) U.S. Cl. .................. 715/215; 715/211; 715/249

(58) Field of Classification Search .................. 715/503, 715/513, 523, 211, 215, 249
See application file for complete search history.

(56) References Cited

U.S. PATENT DOCUMENTS

| | | | |
|---|---|---|---|
| 4,674,043 A * | 6/1987 | Hernandez et al. .......... 715/503 |
| 5,442,741 A | 8/1995 | Hughes et al. |
| 5,745,110 A | 4/1998 | Ertemalp |
| 5,917,499 A | 6/1999 | Jancke |
| 5,990,888 A | 11/1999 | Blades et al. |
| 6,101,513 A | 8/2000 | Shakib et al. |
| 6,182,092 B1 | 1/2001 | Francis et al. |
| 6,223,189 B1 * | 4/2001 | Steffens et al. .............. 715/503 |
| 6,565,609 B1 * | 5/2003 | Sorge et al. ................. 715/503 |
| 6,604,144 B1 | 8/2003 | Anders |
| 6,665,863 B1 | 12/2003 | Lord et al. |
| 6,683,618 B1 | 1/2004 | Patrick et al. |
| 6,690,380 B1 | 2/2004 | Hussain et al. |
| 6,691,281 B1 * | 2/2004 | Sorge et al. ................. 715/503 |
| 6,701,485 B1 | 3/2004 | Igra et al. |
| 6,708,196 B1 | 3/2004 | Atkinson et al. |
| 6,711,715 B1 | 3/2004 | Grealish |
| 6,738,071 B2 | 5/2004 | Barmettler |
| 6,738,777 B2 | 5/2004 | Bliss et al. |
| 6,762,761 B2 | 7/2004 | Devins et al. |
| 2003/0193502 A1 * | 10/2003 | Patel et al. .................. 345/440 |
| 2004/0143788 A1 * | 7/2004 | Aureglia et al. ............. 715/503 |

FOREIGN PATENT DOCUMENTS

EP EP0199909 12/1986
EP EP1531580 5/2005

OTHER PUBLICATIONS

"Application Programming Interface " found at http://www.coffeycountyks.org/Terms/2461HTML-126.html (Jun. 7, 1999).*
Orenstein, David, QuickStudy: Application Programming Interface (API), Jan. 10, 2000, ComputerWorld Development, http://www.computerworld.com/action/article.do?command=printArticleBasic& articleId=43487.*

(Continued)

*Primary Examiner*—Adam M Queler (57) ABSTRACT

A method for rendering a chart associated with a document includes translating a chart object into a shape-based chart definition, wherein the chart object defines the chart with chart elements, and the shape-based shape definition defines the chart with shapes, and maintaining the chart object in the document to enable access to underlying chart data contained in the chart. A system includes a chart object defining a chart with chart elements, a graphics module operable to render shapes, a charting module generating a shape-based chart definition based on the chart object, wherein the shape-based chart definition defines the chart with shapes that can be rendered by the graphics module.

24 Claims, 5 Drawing Sheets

OTHER PUBLICATIONS

"Modular Programming", MIT Course 16.070 Lecture #5 Handout, Feb. 16, 2001 http://web.mit.edu/16.070/www/year2001/Modular_Programming.pdf.*

"Application Programming Interface" found at http://www.coffeycountyks.org/Terms/2461HTML-126.html (Jun. 7, 1999).*

Book1, Source Code and Screenshots, Oct. 26, 2007.*

Fulghum, Liz "Vector vs. Bitmap Graphics—an Introductory Guide for Clients and Designers" Jun. 6, 2003 http://web.archive.org/web/20030715054432/http://www.eastbywest.com/pub/vectorbitmap/.*

"Grouping Shapes", Nov. 16, 1998, http://msdn.microsoft.com/library/default.asp?url=/workshop/author/VML/ref/basic6.asp.*

Jarrett Dennis; "Integrated Software" EMAP Business & Computer Publications Ltd., Oct. 1989, 4 pages.

Asman, P "Creating SVG pie charts through XSLT via web servies: an experience report", *SVG open 2003 conference and exhibition*, http://www.svgopen.org/2003/papers/CreatingSVGPieChartsThroughWebService/index.html,(Jul. 18, 2003),3-8, 16.

Petzold, C "Environments—Metafilr Support Under the OS/2 Graphics Programming Interface", *PC magazine*, (Sep. 24, 1990), 459-465.

* cited by examiner

COMMON CHARTING USING SHAPES

BACKGROUND

A chart is a graphical representation of numerical data. Charts are particularly useful for presenting complicated data in a concise and easily-understandable form. In today's desktop publishing environment, users can create impressive presentations using charts. Charts are based on underlying data that is entered into an application program such as "EXCEL" from MICROSOFT CORPORATION. The underlying data can then be used to create a chart of the data in a number of different formats, such as pie-chart, bar-chart, histogram, line chart, etc. In addition, each part of the chart can have associated colors, textures, and other effects to improve the appearance of the chart, which is very important for conveying information.

Application programs have traditionally used primitive function calls to render charts. The graphics display interface (GDI or GDI+) from "MICROSOFT WINDOWS" and GEL from "MICROSOFT OFFICE", for example, are relatively low-level interfaces that are often used by application programs to render charts. Such low-level interfaces typically provide functions for rendering chart elements at a pixel level. For example, to draw a line, an application program must specify a beginning pixel and an ending pixel. Later, if the line were being stretched, the application program must again specify the new beginning and/or ending pixel. The traditional interfaces do not include higher-level functions, such as a line-stretching function, for handling a group of pixels as a line.

Another problem is that different application programs have traditionally rendered charts differently. For example, in "MICROSOFT WINDOWS", one application program may use the GDI, while another application may use a combination of calls to GEL and GDI. Because the charts are rendered differently, similar elements in charts rendered by different application programs may appear different to the user. Thus, a chart that should otherwise appear the same in MICROSOFT "POWERPOINT" and "EXCEL", for example, may appear slightly different in the two application programs.

Users often copy a chart from one application program and import it into another application program. For example, a chart can be copied from "EXCEL" and pasted into a MICROSOFT "WORD" document or a "POWERPOINT" presentation. Traditionally, a user has been able to paste the chart as either a chart object or a picture. Unfortunately, when the user pastes the chart as a picture, the chart is severed from the underlying data that was used to create the picture. This means the user can no longer manipulate the underlying data of the chart through the pasted chart. For example, the user cannot edit the numerical data or labels in the chart once the chart is pasted as a picture.

In addition, when they are not pasted as pictures, charts in documents can have certain drawbacks. These drawbacks are primarily due to the fact that the chart that is not in picture format is not generated with presentation aspects in mind. For example, sometimes charts appear with an aliasing effect that is distracting to the eye. As another example, when the user resizes the chart, text can appear unusual because the font scaling is imprecise. As yet another example, the chart that is not pasted as a picture sometimes appears different on the computer screen as it does in a printout, because of a difference in coordinate mapping.

Thus, there is a need for the ability to render and manipulate charts consistently across applications. In addition, there is a need to provide a consistent, high-quality presentation of charts while enabling users to manipulate underlying elements of the chart.

DETAILED DESCRIPTION

Described herein are various implementations of systems and methods for rendering and manipulating charts. In accordance with various implementations described herein, a chart is translated from a chart object to a shape-based definition. The chart object defines portions of the chart in terms of chart elements and references the underlying chart data on which the chart is based. Although the chart is rendered as shapes, the chart object is maintained to allow for manipulation of the underlying chart data. A common charting component that is common to one or more application programs uses the chart object to enable a user to manipulate underlying elements of the chart.

The shape-based definition defines the chart in terms of shapes. The shape-based definition is used by a common graphics module to provide consistent shape rendering services and shape manipulation services for different applications. In addition, the common graphics module provides group manipulation functions, whereby a group of related shapes can be manipulated in the chart.

Figure 1:
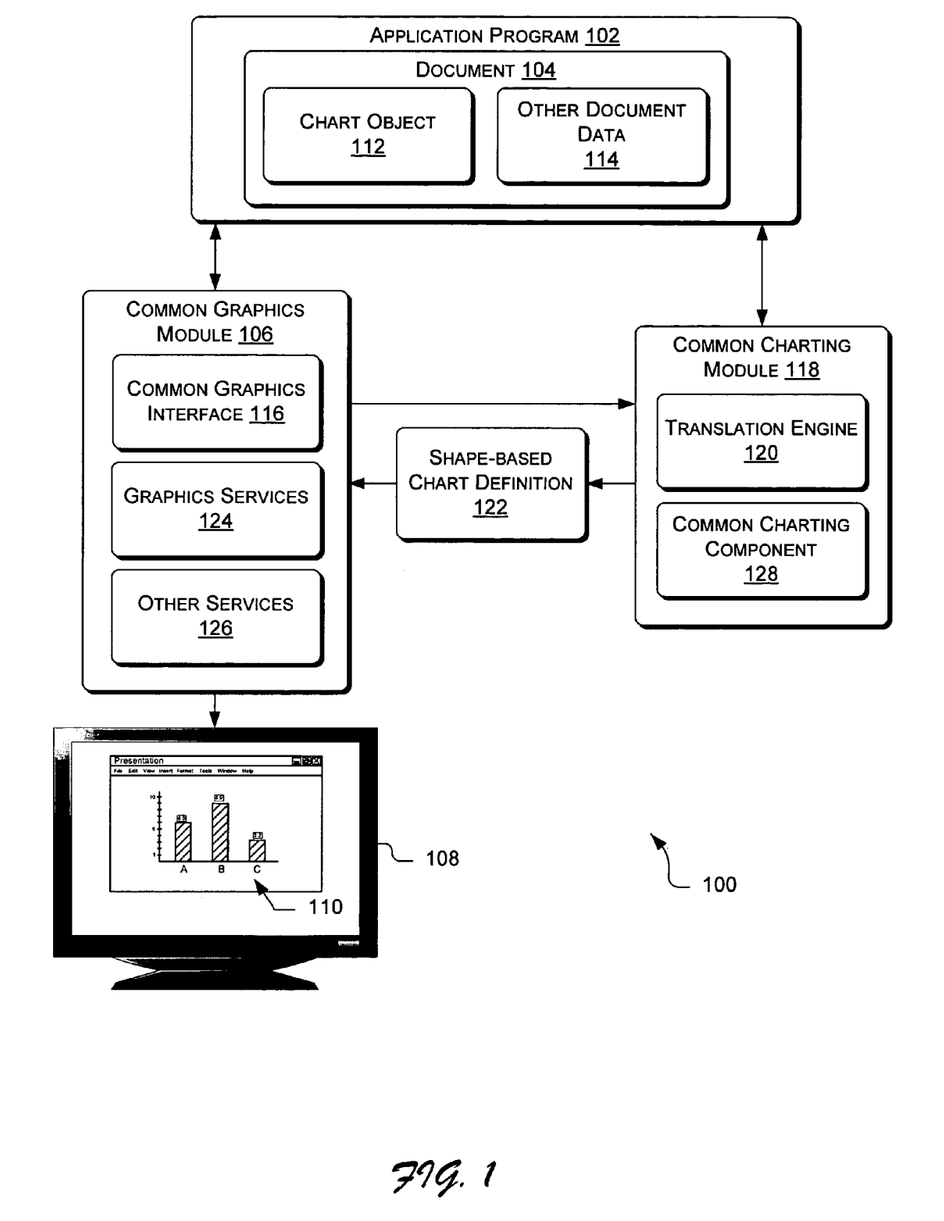
FIG. 1 illustrates an exemplary charting system employing shape-based charting using a common charting component.

FIG. 1 illustrates an exemplary charting system 100 for carrying out common charting using a shape-based chart definition. The term common charting refers to common methods of chart manipulation across multiple and/or different applications. Included in the system 100 are an application program 102 that provides access to a document 104 and a common graphics module 106 for rendering the document 104 on a computer monitor screen 108.

As used herein, a document 104 is a computer-readable file that includes user-readable information, such as text and graphics. The document 104 may be viewed and edited by a user through a user interface of the application program 102. Exemplary types of documents include, but are not limited to, a spreadsheet, a presentation, or a conventional text document. Thus, depending on the type of document, the application program 102 may be, for example, but not limited to, MICROSOFT "WORD", "POWERPOINT", "EXCEL", or other application program. By way of example, as shown on the screen 108, the document 104 is a 'Presentation,' which is often, but not always, associated with "POWERPOINT".

Particularly relevant to the present description is a chart 110 in the presentation. The chart 110 shown in the particular implementation of FIG. 1 is a column chart. In accordance with other implementations, the chart 110 is not limited to a column chart, but can be any other type of chart, such as, but not limited to, a pie chart, a line chart, or a scatter plot. The various data in the chart 110 is originally specified by the document 104. The document 104 specifies the chart 110 with a chart definition called a chart object 112.

The chart object 112 defines the chart 110 in terms of chart elements. Generally, a chart element is a data unit representing an aspect of a chart. Typically a chart element represents an aspect of the chart in relation to the information that the chart conveys or the type of chart. Exemplary chart elements include bars (e.g., for a bar chart), chart axis, chart legends, chart titles, chart labels, element colors, text fonts, element locations, data sources and so on. One implementation of the chart object 112 is a set of extensible markup language (XML) code. To illustrate, an example of XML code from a chart object 112 is shown below:

```
- <c:Chart xmlns:c="chart" xmlns:s="shape">
  - <c:Scaling>
      <c:ScaleID>0</c:ScaleID>
      <c:Orientation>MinMax</c:Orientation>
    </c:Scaling>
  - <c:Scaling>
      <c:ScaleID>1</c:ScaleID>
      <c:Orientation>MinMax</c:Orientation>
    </c:Scaling>
    <c:Name>Chart 1</c:Name>
  - <c:PlotArea>
      <c:Shape />
    - <c:Graph>
        <c:Type>Column</c:Type>
        <c:SubType>Clustered</c:SubType>
        <c:Overlap>0</c:Overlap>
        <c:ScaleID>0</c:ScaleID>
        <c:ScaleID>1</c:ScaleID>
      - <c:Series>
        <c:Index>0</c:Index>
        <c:Name>Series 1</c:Name>
      - <c:Shape>
        - <s:Fill>
          - <s:Pattern>
              <s:Title>Wide upward diagonal</s:Title>
              <s:Color>black</s:Color>
              <s:Color2>white</s:Color2>
            </s:Pattern>
          </s:Fill>
        - <s:Border>
            <s:Weight>0</s:Weight>
            <s:Solid>black</s:Solid>
          </s:Border>
        </c:Shape>
      - <c:DataLabels>
        - <c:Shape>
          - <s:Font>
              <s:FontName>Arial</s:FontName>
              <s:Size>18</s:Size>
              <s:AutoScale />
            </s:Font>
          </c:Shape>
        - <c:Number>
            <c:FormatString>0.0</c:FormatString>
          </c:Number>
          <c:ShowValue />
        </c:DataLabels>
      - <c:Category>
          <c:DataSource>0</c:DataSource>
          <c:Data>Sheet1!$A$1:$A$3</c:Data>
        </c:Category>
      - <c:Value>
          <c:DataSource>0</c:DataSource>
          <c:Data>Sheet1!$B$1:$B$3</c:Data>
        </c:Value>
      </c:Series>
      <c:PlotVisible />
    </c:Graph>
```

-continued

```
    - <c:Axis>
        <c:Placement>Bottom</c:Placement>
        <c:AxisID>0</c:AxisID>
        <c:ScaleID>0</c:ScaleID>
        <c:CrossingAxis>1</c:CrossingAxis>
      - <c:Shape>
        - <s:Font>
            <s:FontName>Arial</s:FontName>
            <s:Size>18</s:Size>
            <s:AutoScale />
          </s:Font>
        </c:Shape>
      - <c:Number>
          <c:SourceLinked />
          <c:BuiltInFormat>0</c:BuiltInFormat>
        </c:Number>
        <c:MajorTick>None</c:MajorTick>
        <c:TickMarkSkip>1</c:TickMarkSkip>
        <c:Type>Automatic</c:Type>
      </c:Axis>
    - <c:Axis>
        <c:Placement>Left</c:Placement>
        <c:AxisID>1</c:AxisID>
        <c:ScaleID>1</c:ScaleID>
        <c:CrossingAxis>0</c:CrossingAxis>
        <c:CrossesAt>Minimum</c:CrossesAt>
        <c:CrossBetween>Between</c:CrossBetween>
      - <c:Shape>
        - <s:Font>
            <s:FontName>Arial</s:FontName>
            <s:Size>18</s:Size>
            <s:AutoScale />
          </s:Font>
        </c:Shape>
      - <c:Number>
          <c:SourceLinked />
          <c:BuiltInFormat>0</c:BuiltInFormat>
        </c:Number>
        <c:MajorTick>Cross</c:MajorTick>
        <c:MinorTick>Cross</c:MinorTick>
        <c:Type>Value</c:Type>
        <c:MajorUnit>5</c:MajorUnit>
      </c:Axis>
    </c:PlotArea>
  </c:Chart>
```

The document 104 typically also has other document data 114, which includes, but is not limited to, text and formatting information. In accordance with one implementation, when the application program 102 is launched and the document 104 is opened, the chart object 112 is passed to a common graphics interface 116 of the common graphics module 106 for rendering.

The common graphics interface 116 determines what type of graphic is represented by the chart object 112. Types of graphics that may be handled by the common graphics interface 116 include, but are not limited to, diagrams, charts, or autoshapes. The chart object 112 includes an identifier that indicates that it defines a chart. Based on the chart identifier, the common graphics interface 116 determines that the chart object 112 defines a chart and sends it to a common charting module 118.

The common charting module 118 includes a translation engine 120 that translates the chart object 112 into a form that the graphics module 106 uses for rendering the chart 110 to the screen 108. Specifically, the translation engine 120 translates the chart object 112 into a shape-based chart definition 122. As its name suggests, the shape-based chart definition 122 defines the chart in terms of shapes, rather than chart elements. As will be described, use of shapes can improve the chart rendering process, chart appearance, and chart manipulation, by allowing for a common mechanism for interacting with graphics.

In the translation process, the translation engine 120 performs a number of operations. For example, the translation engine 120 retrieves data (e.g., numerical data) that makes up the chart 110 from data source(s) referenced in the chart object 112. The data source(s) may be the document 104 itself, or some other source, such as, but not limited to, another document, a database, a file, the Internet, or a queue. In addition to the data, the translation engine 120 may retrieve numerical formatting information that describes how the data is formatted. Numerical formatting information includes, but is not limited to a currency symbol, number of decimal points, percentage or fraction format, or date and time format.

The translation engine 120 also translates the chart elements into shapes, such as lines, rectangles, circles, triangles, and so on. A shape is a data unit that simply represents the visual appearance of a chart element and is not tied to, or reliant upon, the underlying numerical chart data. Thus, for example, a bar in the chart object 112 will be translated into a rectangle in the shape-based chart definition 122; a chart axis will be translated into a line, and so on.

In addition, the translation engine 120 groups selected related shapes to facilitate manipulation of related shapes by the user. The common graphics interface 116 provides functions that allow a user to interact with groups of related shapes. The translation engine 120 takes advantage of those functions by grouping related chart elements such as, but not limited to, related data labels and related data series. After retrieving the data, translating chart elements into shapes, and grouping related shapes, the translation engine 120 generates the shape-based chart definition 122.

An implementation of the shape-based chart definition 122 is composed of XML code. To illustrate, XML code from an exemplary shape-based chart definition 122 is shown below:

```
- <group>
  <id>Chart</id>
- <shapes>
- <rect>
  <id>ChartArea</id>
  <style>margin-left:0;margin-top:9.75pt;width:501pt;height:319.5pt;z-index:1</style>
- <border>
  <Solid>black</Solid>
  <Weight>0</Weight>
  </border>
  </rect>
- <group>
  <id>Series 1</id>
  <style>margin-left:88.5pt;margin-top:60pt;width:359.25pt;height:220.5pt;z-index:3</style>
  <coordorigin>438,743</coordorigin>
  <coordsize>479,294</coordsize>
- <Fill>
- <Pattern>
  <Title>Wide upward diagonal</Title>
  <Color>black</Color>
  <Color2>white</Color2>
  </Pattern>
  </Fill>
- <border>
  <Solid>black</Solid>
  <Weight>0</Weight>
  </border>
- <shapes>
- <rect>
  <id>Point 1</id>
  <style>left:438;top:839;width:80;height:198</style>
  </rect>
```

-continued

```
- <rect>
  <id>Point 2</id>
  <style>left:638;top:743;width:80;height:294</style>
  </rect>
- <rect>
  <id>Point 3</id>
  <style>left:837;top:931;width:80; height:106</style>
  </rect>
  </shapes>
  </group>
- <group>
  <id>Y Axis</id>
- <border>
  <Solid>black</Solid>
  <Weight>0</Weight>
  </border>
- <shapes>
- <line>
  <id>Y Axis Line</id>
  <style>z-index:4</style>
  <from>45pt,32.25pt</from>
  <to>45pt,280.5pt</to>
  </line>
- <line>
  <id>Y Axis Tick Mark 1</id>
  <style>z-index:5</style>
  <from>40pt,281pt</from>
  <to>48pt,281pt</to>
  </line>
- <line>
  <id>Y Axis Tick Mark 2</id>
  <style>z-index:6</style>
  <from>40pt,256pt</from>
  <to>48pt,256pt</to>
  </line>
- <line>
  <id>Y Axis Tick Mark 3</id>
  <style>z-index:7</style>
  <from>40pt,231pt</from>
  <to>48pt,231pt</to>
  </line>
- <line>
  <id>Y Axis Tick Mark 4</id>
  <style>z-index:8</style>
  <from>40pt,207pt</from>
  <to>48pt,207pt</to>
  </line>
- <line>
  <id>Y Axis Tick Mark 5</id>
  <style>z-index:9</style>
  <from>40pt,182pt</from>
  <to>48pt,182pt</to>
  </line>
- <line>
  <id>Y Axis Tick Mark 6</id>
  <style>z-index:10</style>
  <from>40pt,157pt</from>
  <to>48pt,157pt</to>
  </line>
- <line>
  <id>Y Axis Tick Mark 7</id>
  <style>z-index:11</style>
  <from>40pt,132pt</from>
  <to>48pt,132pt</to>
  </line>
- <line>
  <id>Y Axis Tick Mark 8</id>
  <style>z-index:12</style>
  <from>40pt,108pt</from>
  <to>48pt,108pt</to>
  </line>
- <line>
  <id>Y Axis Tick Mark 9</id>
  <style>z-index:13</style>
```

```
<from>40pt,83pt</from>
<to>48pt,83pt</to>
</line>
- <line>
  <id>Y Axis Tick Mark 10</id>
  <style>z-index:14</style>
  <from>40pt,57pt</from>
  <to>48pt,57pt</to>
  </line>
- <line>
  <id>Y Axis Tick Mark 11</id>
  <style>z-index:15</style>
  <from>40pt,33pt</from>
  <to>48pt,33pt</to>
  </line>
- <line>
  <id>Y Axis Tick Mark 12</id>
  <style>z-index:16</style>
  <from>38.25pt,281pt</from>
  <to>49.5pt,281pt</to>
  </line>
- <line>
  <id>Y Axis Tick Mark 13</id>
  <style>z-index:17</style>
  <from>38.25pt,157pt</from>
  <to>49.5pt,157pt</to>
  </line>
- <line>
  <id>Y Axis Tick Mark 14</id>
  <style>z-index:18</style>
  <from>38.25pt,33pt</from>
  <to>49.5pt,33pt</to>
  </line>
  </shapes>
  </group>
- <line>
  <id>X Axis</id>
  <style>z-index:19</style>
  <from>44.25pt,281pt</from>
  <to>492.75pt,281pt</to>
- <border>
  <Solid>black</Solid>
  <Weight>0</Weight>
  </border>
  </line>
- <group>
  <id>Series 1 DataLabels</id>
  <style>margin-left:106.5pt;margin-top:33pt;width:324pt;height:164.25pt;z-index:20</style>
  <coordorigin>462,707</coordorigin>
  <coordsize>432,219</coordsize>
- <Font>
  <FontName>Arial</FontName>
  <Size>18</Size>
  <AutoScale />
  </Font>
- <shapes>
- <rect>
  <id>Series 1 DataLabel 1</id>
  <style>left:462;top:803;width:33; height:31;wrap-style:none;text-anchor:top</style>
- <textbox style="fit-shape-to-text:t" inset="0,0,0,0">
  <div style="text-align:left">6.0</div>
  </textbox>
  </rect>
- <rect>
  <id>Series 1 DataLabel 2</id>
  <style>left:661;top:707; width:33;height:31;wrap-style:none;text-anchor:top</style>
- <textbox style="fit-shape-to-text:t" inset="0,0,0,0">
  <div style="text-align:left">8.9</div>
  </textbox>
  </rect>
- <rect>
  <id>Series 1 DataLabel 3</id>
  <style>left:861;top:895; width:33;height:31;wrap-style:none;text-anchor:top</style>
- <textbox style="fit-shape-to-text:t" inset="0,0,0,0">
  <div style="text-align:left">3.2</div>
  </textbox>
  </rect>
  </shapes>
  </group>
- <group>
  <id>Y Axis Labels</id>
  <style>margin-left:10.5pt;margin-top:22.5pt;width:19.5pt;height:271.5pt;z-index:21</style>
  <coordorigin>334,693</coordorigin>
  <coordsize>26,362</coordsize>
- <Font>
  <FontName>Arial</FontName>
  <Size>18</Size>
  <AutoScale />
  </Font>
- <shapes>
- <rect>
  <id>Y Axis Labels 0</id>
  <style>left:347;top:1024; width:13;height:31;wrap-style:none;text-anchor:top</style>
- <textbox style="fit-shape-to-text:t" inset="0,0,0,0">
  <div style="text-align:left">0</div>
  </textbox>
  </rect>
- <rect>
  <id>Y Axis Labels 5</id>
  <style>left:347;top:858; width:13;height:31;wrap-style:none;text-anchor:top</style>
- <textbox style="fit-shape-to-text:t" inset="0,0,0,0">
  <div style="text-align:left">5</div>
  </textbox>
  </rect>
- <rect>
  <id>Y Axis Labels 10</id>
  <style>left:334;top:693; width:26;height:31;wrap-style:none;text-anchor:top</style>
  stroked="f">
- <textbox style="fit-shape-to-text:t" inset="0,0,0,0">
  <div style="text-align:left">10</div>
  </textbox>
  </rect>
  </shapes>
  </group>
- <group>
  <id>X Axis Labels</id>
  <style>margin-left:112.5pt;margin-top:296.25pt;width:312pt;height:23.25pt; z-index:22</style>
  <coordorigin>470,1058</coordorigin>
  <coordsize>416,31</coordsize>
- <shapes>
- <rect>
  <id>X Axis Labels Category 1</id>
  <style>left:470;top:1058; width:15;height:31;wrap-style:none;text-anchor:top</style>
- <textbox style="fit-shape-to-text:t" inset="0,0,0,0">
  <div style="text-align:left">A</div>
  </textbox>
  </rect>
- <rect>
  <id>X Axis Labels Category 2</id>
  <style>left:670;top:1058; width:16;height:31;wrap-style:none;text-anchor:top</style>
- <textbox style="fit-shape-to-text:t" inset="0,0,0,0">
  <div style="text-align:left">B</div>
  </textbox>
  </rect>
```

-continued

```
- <rect>
    <id>X Axis Labels Category 3</id>
    <style>left:869;top:1058; width:17;height:31;wrap-style:none;text-
    anchor:top</style>
- <textbox style="fit-shape-to-text:t" inset="0,0,0,0">
    <div style="text-align:left">C</div>
  </textbox>
  </rect>
  </shapes>
  </group>
  </shapes>
  </group>
```

The graphics interface 116 receives the shape-based chart definition 122 and renders the chart 110 on the screen 108 as a set of shapes specified by the shape-based chart definition. The common graphics interface 116 typically performs the rendering by making calls to operating system or display controller functions. For example, in the WINDOWS operating system, the common graphics interface 116 may make calls to the graphics display interface (GDI+).

As shown, the common graphics module 106 includes a set of common graphics services 124. The common graphics services 124 include services accessible by the application program for manipulating the chart 110. The common graphics services 124 provide one or more application programming interface(s) (API) to access the services.

Because the common graphics module 106 renders, shapes, the graphics services 124 are able to offer high-level functions for manipulating the chart 110. The graphics services 124 can, for example, perform vector-graphics functions on shapes within the chart. To illustrate, a rectangle can be moved easily by calling a single function of the graphics services 124 that moves a shape, rather than calling numerous low-level functions to redraw the rectangle in a new location. In addition, the common graphics module 106 is common to multiple application programs, so that shape manipulation/editing and appearance will be consistent among the application programs. Thus, the common graphics module 106 can present a common graphics user interface for editing shapes in the chart 110, regardless of the type of application program 102.

The common graphics module 106 also includes other services 126 for rendering and/or manipulating contents of the document 104 on the screen 108. The other services 126 can include, but are not limited to, memory allocation and text-related manipulations.

After the chart 110 is rendered, the user may manipulate the shapes in the chart 110 or the underlying data of the chart 110. Most commands to edit the chart are passed to the common charting component 128. The common charting component 128 can then act on the command or pass the command back to the graphics services 124. Prior to passing a command to the graphics services 124, the common charting component 128 can modify the command, if needed. If the user edits the underlying chart data and thereby changes the chart object 112, the translation engine 118 automatically translates the chart object 112 again into an updated shape-based chart definition 122.

When the user manipulates the underlying data of the chart 110, a common charting component 128 provides functions for the manipulations. In the past, when the user manipulated a chart, the application program 102 performed the manipulations. This resulted in different chart presentation and behavior, and different user interaction between different application programs. In implementations described herein, the common charting component 128 provides a common set of functions for manipulating the underlying chart data that makes up the chart 110. As a result, when the user edits the underlying chart data, the behavior of the chart 110 is consistent across all application programs.

Beneficially, although the chart 110 is rendered using a shape-based chart definition 122, the underlying chart data is still maintained in (i.e., not removed from) the document 104 in the chart object 112. The common charting component 128 uses the chart object 112 when the user edits the underlying chart data (e.g., the numerical data). Thus, the user is enabled to edit shapes of the chart 110 via the common graphics interface 116, and edit underlying chart data via the common charting component 128. Even when the document 104 is closed, the chart object 112 is maintained in the document 104. As a result, the user can edit the chart 110 as a chart and/or a picture.

In a particular implementation, the shape-based chart definition 122 can be saved for future use. In this implementation, the shape-based chart definition 122 could be saved with the document 104 or in a cache memory (not shown) before the document 104 is closed. Then, when the document 104 is opened later, the shape-based chart definition 122 is retrieved from memory and used for rendering the chart 110. In this implementation, the translation engine 120 would not need to translate the chart object 112 every time the document 104 is opened.

The term module is used in a general sense to describe a component that is operable to perform one or more designated functions. A module may be implemented in various ways and forms. For example, a module may be implemented in or as hardware, software, firmware, or in various combinations of hardware, software, and/or firmware, depending on such factors as speed, cost, size, etc. For example, and without limitation, in one implementation each of the modules in the system 100 comprises software, such as a dynamic link library (DLL), that is stored on a computer-readable medium and executed on a computing system, such as the computing system described below with respect to FIG. 6.

Exemplary Operations

Figure 2:
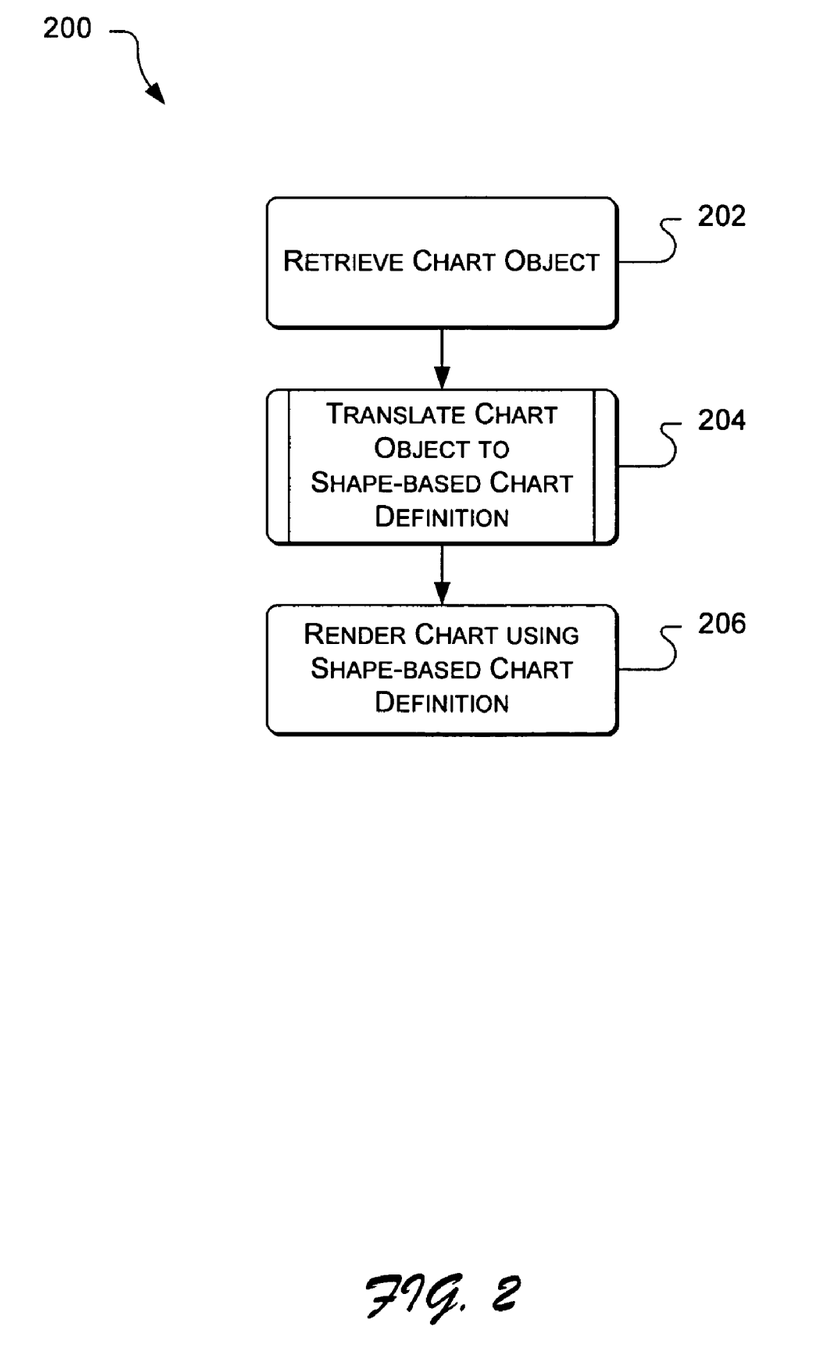
FIG. 2 is a flowchart illustrating rendering a chart using shapes derived from a chart object.

FIG. 2 illustrates a common charting algorithm 200 that can be carried out by the charting system 100 shown in FIG. 1. The common charting algorithm 200 may likewise be carried out by systems other than the common charting system 100. The common charting algorithm 200 includes exemplary operations for using shapes to render a chart associated with a document, while maintaining a chart object to enable a user to edit underlying chart data.

Initially, a retrieving operation 202 retrieves a chart object that provides a definition of the chart. Typically, the chart object is retrieved from the document. The chart object defines parts of the chart with chart elements, such as bars, axis, labels, numerical data, and so on, which are inherently related to a chart. The chart object provides references to data sources of the underlying chart data, on which the chart is based.

A translating operation 204 translates the chart object into a shape-based chart definition, so that the chart can be rendered and edited using shapes. Shapes specify the visual appearance (e.g., size, location, and color) of chart elements. A data label or other text element can also be converted into a shape by creating a rectangle with the corresponding text or label in the rectangle. A text or label rectangle can be edited to be filled with a specified color, or to have a border, or other graphical effects appropriate for a rectangle. An exemplary translating operation 204 is shown in FIG. 3 and described below.

After the chart object is translated into a shape-based definition, a rendering operation 206 renders the chart using the shapes specified in the shape-based definition. Typically, the chart is rendered at a location specified by the document. Locations, colors, groupings, dimensions, and other attributes of shapes within the chart can be specified by the shape-based definition.

Although the chart is rendered with shapes, the chart object persists in association with the document. In other words the chart object is not disassociated from the document. Because the chart object is maintained, a user can continue to edit the underlying chart data. Whenever the user edits the chart object by editing the underlying chart data, the translating operation 204 will be performed.

Figure 3:
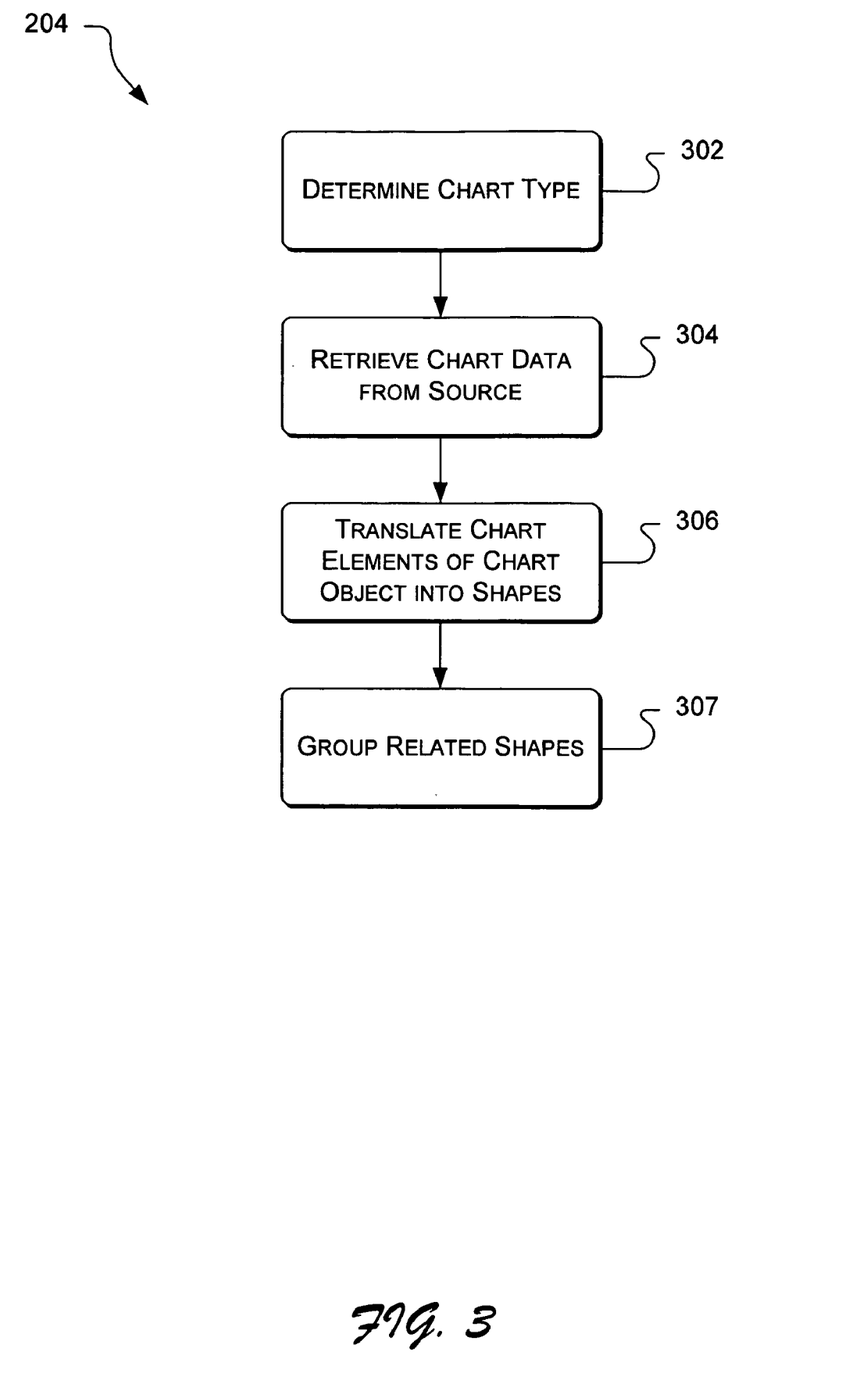
FIG. 3 is a flowchart illustrating translating a chart object to a shape-based chart definition.

Turning to FIG. 3, there is shown an exemplary translating operation 204. The translating operation 204 can be performed at any relevant time or in response to a relevant event. For example, and without limitation, the translating operation 204 can be performed automatically whenever the document is opened, or when the chart is copied from one document and imported into another document. The translating operation 204 is discussed with reference to FIG. 4, for ease of illustration. Thus, for purposes of illustration, it will be assumed here that the chart object and the corresponding shape-based definition define the chart 400 shown in FIG. 4.

Figure 4:
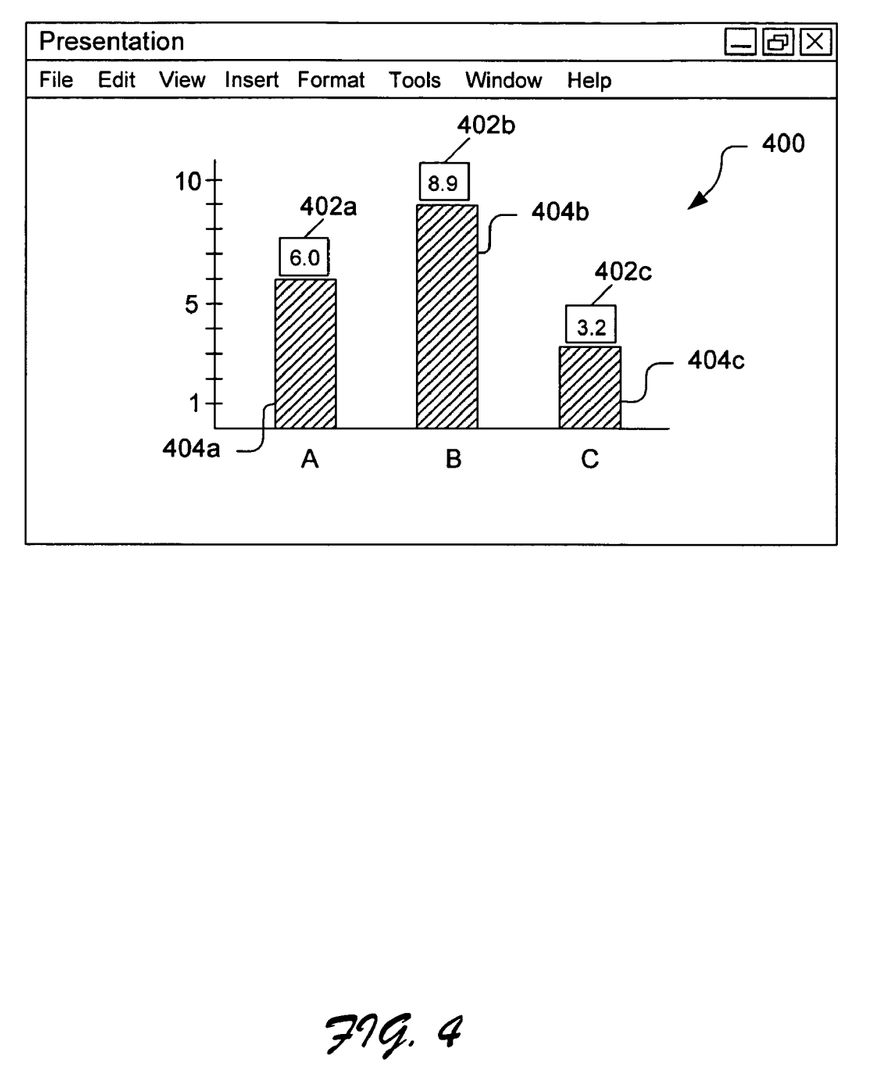
FIG. 4 illustrates a chart having data, labels, series, and other chart elements that can be translated to shapes and/or grouped by the translation engine.

Initially a determining operation 302 determines the type of chart 400. In the particular case shown, the chart object includes a chart type identifier indicating that the chart is a column chart. Thus, the determining operation 302 determines that the chart is a column chart. The type of chart is determined because the chart type is typically relevant to give meaning to data values, and dictate how chart elements will be translated to shapes.

A retrieving operation 304 then retrieves underlying data that serves as the basis for the chart. Typically, but without limitation, the underlying chart data includes data values, labels, and data formats, such as currency type or decimal place. The underlying data is retrieved from one or more data sources specified by the chart object. Thus, with reference to the chart 400, the underlying data that is retrieved includes data label 402a (6.0), data label 402a (8.9), and data label 402c (3.2).

A translating operation 306 then translates chart elements into corresponding shapes. With reference to the chart 400, a first column in the chart object, for example, is translated into a rectangle 404a, whose dimensions are based on the data value associated with the column. The translating operation 306 determines the dimensions of the rectangle 404a by first identifying the column 404b with the greatest value (in this case 8.9), and linearly scaling the rectangle 404 a based on the height of the chart. Similarly, the translating operation 306 translates the other two columns into associated rectangles 404b and 404c.

A grouping operation 307 then groups related shapes. It is best to group shapes that a user may want to edit or manipulate as a group. For example, the data labels 402a, 402b, and 402c can be grouped. As another example, rectangles 404a, 404b, and 404c can be grouped. The grouping operation 307 inserts a group indicator into the shape-based chart definition that indicates which shapes are in a group.

After related shapes are grouped, a common graphics module (e.g., common graphics module 104, FIG. 1), can apply group effects based on user input. For example, if the user wants to change the color of all the rectangles in the chart 400, the user only needs to select one of the rectangles and change the color. Such groups can be useful because the user can then manipulate every shape in a group by clicking on a shape in the group once. If the user wants to manipulate a single shape in a group, the user clicks twice on the shape.

Exemplary Computing Device

Figure 5:
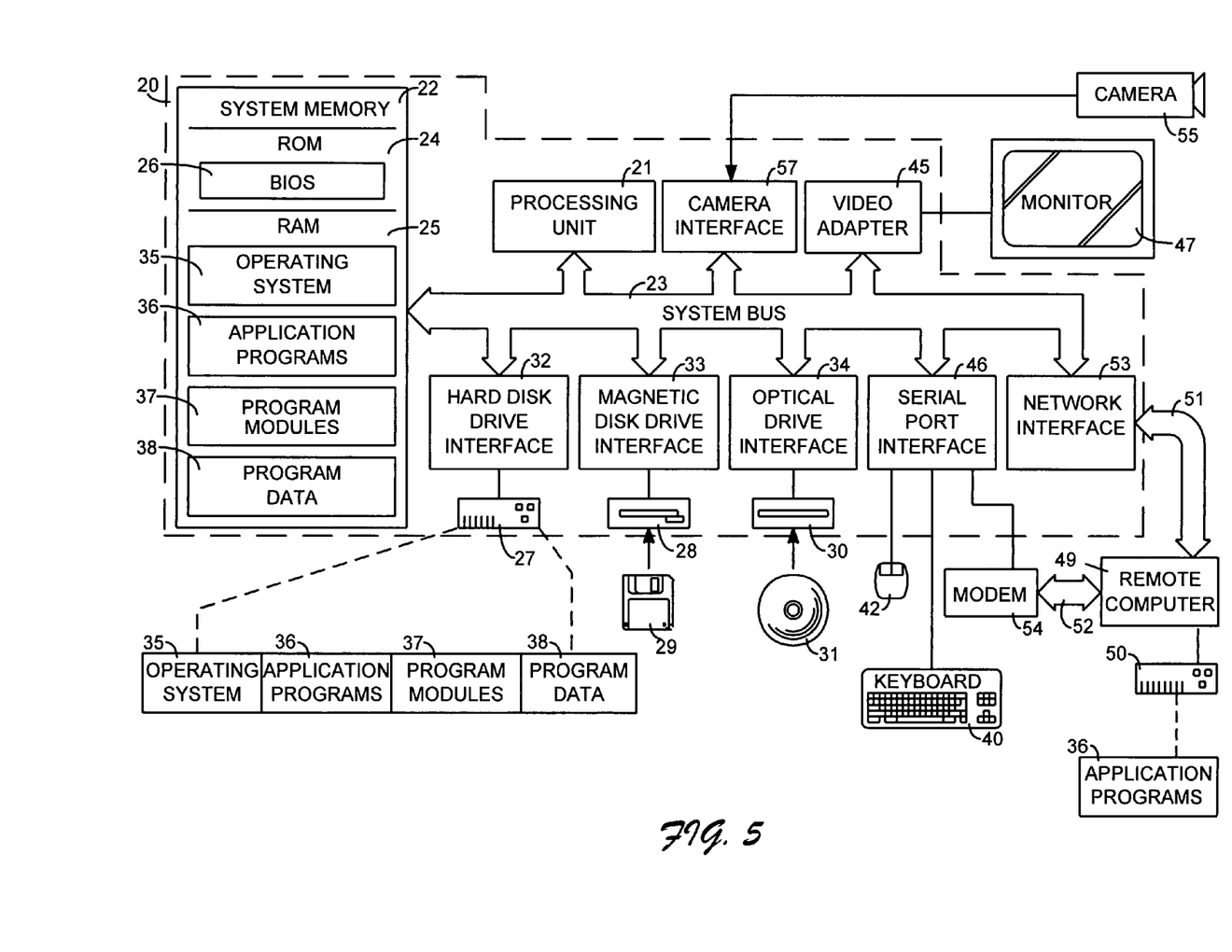
FIG. 5 illustrates a general purpose computer that can be used to implement common charting systems and methods described herein.

With reference to FIG. 5, an exemplary system for implementing the operations described herein includes a general-purpose computing device in the form of a conventional personal computer 20, including a processing unit 21, a system memory 22, and a system bus 23. System bus 23 links together various system components including system memory 22 and processing unit 21. System bus 23 may be any of several types of bus structures including a memory bus or memory controller, a peripheral bus, and a local bus using any of a variety of bus architectures. System memory 22 includes read only memory (ROM) 24 and random access memory (RAM) 25. A basic input/output system 26 (BIOS), containing the basic routine that helps to transfer information between elements within the personal computer 20, such as during start-up, is stored in ROM 24.

As depicted, in this example personal computer 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD ROM, DVD, or other like optical media. Hard disk drive 27, magnetic disk drive 28, and optical disk drive 30 are connected to the system bus 23 by a hard disk drive interface 32, a magnetic disk drive interface 33, and an optical drive interface 34, respectively. These exemplary drives and their associated computer-readable media provide nonvolatile storage of computer readable instructions, data structures, computer programs and other data for the personal computer 20.

Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, random access memories (RAMs), read only memories (ROMs), and the like, may also be used in the exemplary operating environment.

A number of computer programs may be stored on the hard disk, magnetic disk 29, optical disk 31, ROM 24 or RAM 25, including an operating system 35, one or more application programs 36, other programs 37, and program data 38. A user may enter commands and information into the personal computer 20 through input devices such as a keyboard 40 and pointing device 42 (such as a mouse).

A camera 55 (such as a digital/electronic still or video camera, or film/photographic scanner) capable of capturing image data can also be included as an input device to the personal computer 20. The images data is input into the computer 20 via an appropriate camera interface 57. In this example, interface 57 is connected to the system bus 23, thereby allowing the images to be routed to and stored in the RAM 25, or one of the other data storage devices associated with the computer 20. It is noted, however, that image data can be input into the computer 20 from any of the aforementioned computer-readable media as well, without requiring the use of the camera 55.

Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, a universal serial bus (USB), etc.

A monitor 47 or other type of display device is also connected to the system bus 23 via an interface, such as a video adapter 45. In addition to the monitor, personal computers typically include other peripheral output devices (not shown), such as speakers and printers.

Personal computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to the personal computer 20.

The logical connections depicted in FIG. 5 include a local area network (LAN) 51 and a wide area network (WAN) 52. Such networking environments are commonplace in offices, enterprise-wide computer networks, Intranets and the Internet.

When used in a LAN networking environment, personal computer 20 is connected to local network 51 through a network interface or adapter 53. When used in a WAN networking environment, the personal computer 20 typically includes a modem 54 or other means for establishing communications over the wide area network 52, such as the Internet. Modem 54, which may be internal or external, is connected to system bus 23 via the serial port interface 46.

In a networked environment, computer programs depicted relative to personal computer 20, or portions thereof, may be stored in a remote memory storage device. It will be appreciated that the network connections shown are exemplary and other means of establishing a communications link between the computers may be used.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer-readable media. Computer-readable media can be any available media that can be accessed by a computer. By way of example, and not limitation, computer-readable media may comprise "computer storage media" and "communications media."

"Computer storage media" includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer-readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer-readable media.

Although the exemplary operating embodiment is described in terms of operational flows in a conventional computer, one skilled in the art will realize that the present invention can be embodied in any platform or environment that processes and/or communicates video signals. Examples include both programmable and non-programmable devices such as hardware having a dedicated purpose such as video conferencing, firmware, semiconductor devices, hand-held computers, palm-sized computers, cellular telephones, and the like.

Although some exemplary methods and systems have been illustrated in the accompanying drawings and described in the foregoing Detailed Description, it will be understood that the methods and systems shown and described are not limited to the particular implementation described herein, but rather are capable of numerous rearrangements, modifications and substitutions without departing from the spirit set forth herein.

What is claimed is:

1. A method for rendering a chart associated with a document, the method comprising:
   receiving a chart object, the chart object defining the chart with chart elements and referencing a data source of underlying chart data on which the chart is based, the underlying chart data including data values for the chart;
   determining a type of chart represented by the chart object;
   retrieving the underlying chart data from the data source referenced by the chart object;
   translating a plurality of chart elements into a plurality of corresponding shapes based on the type of chart and the data values associated with each of the plurality of chart elements using a translation engine of a common charting module that can be used by multiple application programs and includes a common charting component;
   generating a shape-based chart definition based on the plurality of corresponding shapes, wherein the determining, retrieving, translating and generating are performed automatically when the document is opened;
   maintaining the chart object in the document to enable access to underlying chart data contained in the chart; and
   editing the chart through the common charting component.

2. A method as recited in claim 1 further comprising rendering the chart based on the shape-based chart definition.

3. A method as recited in claim 1 wherein the retrieving comprises retrieving the data from one or more of the following:
   the document;
   a database;
   a file; or
   the Internet.

4. A method as recited in claim 1 wherein the translating comprises grouping related shapes.

5. A method as recited in claim 4 further comprising applying a group effect to related shapes in a group.

6. A method as recited in claim 1 wherein the determining, retrieving, translating and generating are performed automatically when the chart is copied to another document.

7. A method as recited in claim 1 further comprising caching the shape-based chart definition.

8. A method as recited in claim 1 further comprising:
manipulating underlying chart data based on the chart object; and
manipulating a shape in the chart based on the shape-based chart definition.

9. A computer-readable storage medium having stored thereon computer-executable instructions for causing a computer to perform a process for rendering a chart associated with a document, the process comprising:
receiving a chart object defining the chart with one or more chart elements;
determining a type of chart represented by the chart object;
retrieving the underlying chart data from the data source referenced by the chart object, the underlying chart data including data values for the chart;
translating a plurality of chart elements into a plurality of corresponding shapes based on the type of chart and the data values associated with each of the plurality of chart elements using a translation engine of a common charting module that can be used by multiple application programs and includes a common charting component;
generating a shape-based chart definition based on the plurality of corresponding shapes, wherein the computer-executable instructions are configured to automatically perform the determining, retrieving, translating and generating when the document is opened;
rendering the chart using the shape-based chart definition without disassociating the chart object from the document; and
editing the chart through the common charting component.

10. A computer-readable storage medium as recited in claim 9 wherein the generating comprises:
putting two or more related shapes into a group.

11. A computer-readable storage medium as recited in claim 10 wherein the two or more related shapes correspond to two or more chart labels.

12. A computer-readable storage medium as recited in claim 10 wherein the two or more related shapes correspond to a series of data points in the chart.

13. A computer-readable storage medium as recited in claim 10 further comprising applying a group effect to all of the shapes in the group.

14. A computer-readable storage medium as recited in claim 10 further comprising:
detecting a first user-selection event of a shape in the group of shapes; and
in response to detecting the first user-selection events editing the chart by applying a first user-manipulation to all of the shapes in the group.

15. A computer-readable storage medium as recited in claim 10 further comprising:
detecting a second user-selection event of a shape in the group of shapes; and
in response to detecting the second user-selection event, editing the chart by applying a second user-manipulation only to the shape.

16. A computer-readable storage medium as recited in claim 9 wherein the generating further comprises determining a dimension of a shape associated with a chart element based on one or more data values characteristic of the chart element.

17. A system comprising:
a processing unit;
a document including a chart;
a chart object defining the chart with chart elements;
a graphics module operating on the processing unit and operable to render shapes;
a common charting module operating on the processing unit and operable to automatically generate a shape-based chart definition based on the chart object when the document is opened, wherein the common charting module includes a translation engine and a common charting component and can be used by multiple application programs, wherein the shape-based chart definition defines the chart with shapes that can be rendered by the graphics module and wherein the common charting module is also operable to determine a type of chart represented by the chart object, retrieve underlying chart data, including data values for the chart, from a data source referenced by the chart object, translate a plurality of chart elements into a plurality of corresponding shapes based on the type of chart and the data values associated with each of the plurality of chart elements using the translation engine, and manipulate charts using the common charting component.

18. A system as recited in claim 17 wherein the data source is one or more of the following:
a document associated with the chart object;
a file;
a database; or
the Internet.

19. A system as recited in claim 17 wherein the translation engine puts related shapes from the plurality of corresponding shapes into a group.

20. A system as recited in claim 17 wherein the charting module determines a dimension of a shape associated with one of the plurality of chart elements based on one or more data values associated with the chart element.

21. A system comprising:
a document including a chart, wherein the chart is defined with chart elements;
a processing unit;
one or more computer storage media containing a computer program that is executable by the processing unit, the computer program including:
means for rendering shapes representative of the chart elements; and
means for translating the chart elements into shapes that can be rendered by a graphics module, wherein the means for translating can be shared by multiple application programs and comprises:
means for determining a type of chart;
means for retrieving underlying chart data from a data source referenced by the chart, the underlying chart data including data values for the chart;
means for translating the chart elements into corresponding shapes based on the type of chart and the data values associated with each of the plurality of chart elements; and
means for generating a shape based chart definition based on a plurality of corresponding shapes, wherein the means for determining, retrieving, translating and generating are performed automatically when the document is opened; and
means for manipulating the chart in a common manner by multiple application programs.

22. A system as recited in claim 21 wherein the means for translating comprises means for determining dimensions of a shape associated with the chart element based on the one or more data values.

23. A system as recited in claim 21 wherein the shapes are specified in extensible markup language code.

24. A system as recited in claim 22 wherein the means for translating further groups one or more related shapes, whereby a group effect can be applied to all the related shapes in the group.

* * * * *